(12) United States Patent
Archambault et al.

(10) Patent No.: US 7,340,733 B2
(45) Date of Patent: Mar. 4, 2008

(54) OPTIMIZING SOURCE CODE FOR ITERATIVE EXECUTION

(75) Inventors: Roch Georges Archambault, Scarborough (CA); Robert James Blainey, Newmarket (CA); Charles Brian Hall, Calgary (CA); Yingwei Zhang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/314,094

(22) Filed: Dec. 5, 2002

(65) Prior Publication Data
US 2003/0115579 A1 Jun. 19, 2003

(30) Foreign Application Priority Data
Dec. 18, 2001 (CA) .................................. 2365375

(51) Int. Cl.
G06F 9/44 (2006.01)
G06F 9/45 (2006.01)

(52) U.S. Cl. ...................... 717/151; 717/106; 717/140; 717/158; 717/159

(58) Field of Classification Search .................. 717/9, 717/151, 210, 150, 160
See application file for complete search history.

(56) References Cited

U.S. PATENT DOCUMENTS

| | | | |
|---|---|---|---|
| 5,136,696 A | 8/1992 | Beckwith et al. | 395/375 |
| 5,333,283 A | 7/1994 | Emma et al. | 395/375 |
| 5,704,053 A | 12/1997 | Santhanam | 284/383 |
| 5,751,981 A | 5/1998 | Witt et al. | 395/380 |
| 5,778,423 A | 7/1998 | Sites et al. | 711/118 |
| 5,794,028 A | 8/1998 | Tran | 395/587 |
| 5,805,863 A * | 9/1998 | Chang | 717/158 |
| 5,867,682 A | 2/1999 | Witt et al. | 395/386 |
| 5,867,683 A | 2/1999 | Witt et al. | 395/394 |
| 6,226,790 B1 * | 5/2001 | Wolf et al. | 717/135 |

(Continued)

OTHER PUBLICATIONS

"Branch Strategies: Modeling and Optimization", Dubey et al., IEEE Transactions on Computers, vol. 40, No. 10, Oct. 1991, pp. 1159-1167.

"Reducing Indirect Function Call Overhead in C++ Programs", Calder et al., Conference Record of POPL '94: 21st ACM SIGPLAN-SIGACT Symposium on Principles of Programming Languages.

(Continued)

Primary Examiner—Tuan Dam
Assistant Examiner—Isaac T. Tecklu
(74) Attorney, Agent, or Firm—Matthew W. Baca; Amy J. Pattillo

(57) ABSTRACT

An embodiment of the present invention provides an optimizer for optimizing source code to generate optimized source code having instructions for instructing a central processing unit (CPU) to iteratively compute values for a primary recurrence element. A computer programmed loop for computing the primary recurrence element and subsequent recurrence elements is an example of a case involving iteratively computing the primary recurrence element. The CPU is operatively coupled to fast operating memory (FOM) and operatively coupled to slow operating memory (SOM). SOM stores the generated optimized source code. The optimized source code includes instructions for instructing said CPU to store a computed value of the primary recurrence element in a storage location of FOM. The instructions also includes instructions to consign the computed value of the primary recurrence element from the storage location to another storage location of the FOM.

48 Claims, 8 Drawing Sheets

U.S. PATENT DOCUMENTS

| | | | |
|---|---|---|---|
| 6,351,849 B1* | 2/2002 | Chen | 717/159 |
| 6,539,541 B1* | 3/2003 | Geva | 717/150 |
| 6,748,589 B1* | 6/2004 | Johnson et al. | 717/150 |
| 7,000,227 B1* | 2/2006 | Henry | 717/152 |
| 2001/0020294 A1* | 9/2001 | Ogawa et al. | 717/9 |
| 2003/0079209 A1* | 4/2003 | Sinha | 717/150 |
| 2004/0205320 A1* | 10/2004 | Haugen et al. | 711/210 |
| 2004/0255284 A1* | 12/2004 | Kobayashi | 717/151 |

OTHER PUBLICATIONS

"Simultaneous Viewing of Performance Monitor Data Independent of Counters", IBM Technical Disclosure Bulletin, vol. 39, No. 10, Oct. 1996, pp. 181-183.

"Optimum Thread Selection In An OO Application Server" IBM Research Disclosure, Article 416151, Dec. 1998, pp. 1722-1723.

* cited by examiner

OPTIMIZING SOURCE CODE FOR ITERATIVE EXECUTION

FIELD OF THE INVENTION

This invention relates to optimizing source code and more specifically to optimizing source code having instructions for iterative execution by a central processing unit.

BACKGROUND OF THE INVENTION

Known to the inventor, which is depicted in FIG. 1, is a computing environment for executing executable code including a computer program programmed loop having related instructions. The computing environment includes computer system 112 having CPU (Central Processing Unit) 116 and memory 114 operatively connected to CPU 116.

Memory 114 stores source code 100, compiler 118, executable code 120, and memory storage locations 122. Typically, compiler 118 and source code 100 reside or are stored in long-term memory (not depicted) such as a hard disk or a floppy disk. As directed by a user, CPU 116 transfers compiler 118 and source code 100 from long-term memory to memory 114. Once transferred to memory 114, compiler 118 instructs CPU 116 to compile source code 100 to generate executable code 120. Typically, memory 114 is RAM (Random Access Memory).

Source code 100 includes computer programmed instructions written in a computer programming language. Instructions forming source code 100 are used for instructing CPU 116 to achieve or perform specific tasks. Source code 100 includes start instructions 102 for starting operations of CPU 116, set of instructions 104 (which will be executed once by CPU 116), computer programmed loop 105 having instructions 106 (which will be repeatedly executed "N−1" times by CPU 116) for computing numerical values of various array elements, and stop instructions 110 for stopping execution of source code 100.

Executable code 120 includes executable instructions related to loop 105 for instructing or directing CPU 116 to compute numerical values for the elements of array A[1], A[2], A [3], . . . , A[N−1], provided that a numerical value for array element A[0] exists prior to the commencement of computation. When CPU 116 executes executable code 120, the compiled instructions related to block 102 are initially executed, followed by the execution of the compiled instructions related to block 104 and block 105, and then followed by the execution of the compiled instructions of block 110. CPU 116 will repetitively execute the compiled instructions of computer programmed loop 105 for a predetermined number of executions. For each iterative step of a computer programmed loop, a numerical value of an array element (such as A[i]) is computed by CPU 116 which then will store the computed numerical value to a memory storage location 122 (before CPU computes another numerical value for another array element).

A computer programmed loop is a series of instructions which are performed repeatedly until some specific condition is satisfied, whereupon a branch instruction is obeyed to exit from the computer programmed loop. The branch instruction specifies the address of the next instruction to be performed by a CPU. Computer programmed loop 105 includes instructions for repeated execution by CPU 116. Computer programmed loops are also known as strongly connected regions. Computer programmed loop 105 includes an induction variable (depicted as "i") which has a related induction value that changes for each iterated or repeated step of computer programmed loop 105. For each iterated step of computer programmed loop 105, the induction value is changed in a predetermined manner, such as adding a numerical value of '1' to a current induction value related to a current iterated step. As shown in FIG. 1, for each iterative step of the computer programmed loop, computation 106 will be performed by CPU 116 in which a value for an array element A[i] in block 107 will be computed by adding the value of a previously computed array element A[i−1] plus the numerical value of "1". The computational task is depicted in block 108. Typically, the changed induction value is subsequently used in a next iterative step for modifying the instructions related to the next iterated step. Computer programmed loop 105 provides a convenient way to avoid repeatedly expressing repetitive instructions by expressing the instructions once. It is understood that CPU 116 will repeatedly execute the instructions of computer programmed loop 'N−1' times. This conveniently allows a software programmer to avoid explicitly writing the instructions 'N−1' times. Disadvantageously, a significant amount of CPU processing time will be spent executing the compiled instructions of computer programmed loop 105.

It will be understood that for each iterative step of computer programmed loop 105, executable code 120 instructs CPU 116 to obtain (load/read) a value of an array element A[i−1] from a specific location in memory storage locations 122, to add a numerical value of "1" to array element A[i−1], and to place (store/write) the computational result (that is array element A[i]) to another specific location in memory storage location 122. Disadvantageously, computer programmed loop 105 requires, with each iterative step of an induction variable, CPU 116 to load/read various recurrence elements from main memory, compute a value for a primary recurrence element, and then store/write the primary recurrence element to the main memory (such as locations 122). Recurrence elements are values which are re-computed for each iterative step of a computation process. An example of a computation process which re-computes values of recurrence elements is a computer programmed loop which computes various array elements (which act like recurrence elements) for each step of the loop. This is an inefficient system for computing or processing values (such as numerical data or alphanumeric data) associated with a computer programmed loop because time is wasted when the CPU interacts with slow operating memory when performing a multitude of load/read or store/write operations for each iterative step of the computer programmed loop. Additionally, if storage locations 122 are storage locations in nonvolatile memory (that is not RAM), the effects are exaggerated.

Accordingly, a system which addresses, at least in part, these and other shortcomings is desired.

SUMMARY OF THE INVENTION

An object of the present invention is to reduce the amount of CPU processing time to be spent executing compiled instructions of a computer programmed loop.

Another object of the present invention is to construct a computer programmed loop that reduces the need to repetitively require a CPU to load/read values of recurrence elements from slow operating memory for computing a value for a primary recurrence element.

An embodiment of the present invention provides an optimizer for optimizing source code to generate optimized source code having instructions for instructing a central processing unit (CPU) to iteratively compute values for a primary recurrence element. A computer programmed loop for computing the primary recurrence element and subsequent recurrence elements is an example of a case involving iteratively computing the primary recurrence element. The CPU is operatively coupled to fast operating memory (FOM) and operatively coupled to slow operating memory (SOM). SOM stores the generated optimized source code. The optimized source code includes instructions for instructing said CPU to store a computed value of the primary recurrence element in a storage location of FOM. The instructions also includes instructions to consign the computed value of the primary recurrence element from the storage location to another storage location of the FOM.

Another embodiment of the present invention provides an optimization mechanism for optimizing computer programmed instructions which direct a Central Processing Unit (CPU) to iteratively compute values for a primary recurrence value based on the values of various recurrence elements. The computer programmed instructions direct the CPU to alternatively execute load/read and store write instructions which transfer computed recurrence values between main memory and fast operating memory for each iteration. The optimized computer programmed instructions direct the CPU to execute a single read/load instruction for moving initial recurrence values from main memory to fast operating memory. For each subsequent iteration, the instructions direct the CPU to compute and store/write final values of recurrence elements to main memory, and direct the CPU to setup subsequently required values of recurrence elements by interchanging loaded values of recurrence elements in fast operating memory. The optimization mechanism can be incorporated with a compiler for compiling the optimized code to generate optimized executable code for execution by the CPU.

Another embodiment of the present invention provides a compiler for compiling computer programmed instructions that will be iteratively executed by a CPU. An example of computer programmed instructions to be iteratively executed are instructions associated with a computer programmed loop. The computer programmed loop is also known as a 'strongly connected region' because the 'region' of instructions or code is to be re-executed in response to the CPU repeatedly executing a branching instruction. The compiler includes mechanisms for detecting when a branching instruction occurs such that a portion of code is being repeated. The compiler can detect whether a value associated with variable within the portion of code is required to change with each iterative step (that is each time the branching operation occurs).

In a first aspect of the present invention, there is provided an optimizer for optimizing source code to generate optimized source code having instructions for instructing a central processing unit (CPU) to iteratively compute values for a recurrence element, the CPU operatively coupled to fast operating memory (FOM) and operatively coupled to slow operating memory (SOM) for storing the generated optimized source code, wherein the generated optimized source code comprises instructions for instructing the CPU to store a computed value of the recurrence element in a storage location of the FOM for use in a further iteration.

In a further aspect of the present invention, there is provided a method for optimizing source code to generate optimized source code having instructions for instructing a central processing unit (CPU) to iteratively compute values for a recurrence element, the CPU operatively coupled to fast operating memory (FOM) and operatively coupled to slow operating memory (SOM) for storing the generated optimized source code, wherein the generated optimized source code comprises instructions for instructing the CPU to store a computed value of the recurrence element in a storage location of the FOM for use in a further iteration.

In a further aspect of the present invention, there is provided a computer program product for use in a computer system operatively coupled to a computer readable memory, the computer program product including a computer-readable data storage medium tangibly embodying computer readable program instructions for providing an optimizer for optimizing source code to generate optimized source code having instructions for instructing a central processing unit (CPU) to iteratively compute values for a recurrence element, the CPU operatively coupled to fast operating memory (FOM) and operatively coupled to slow operating memory (SOM) for storing the generated optimized source code, wherein the generated optimized source code comprises instructions for instructing the CPU to store a computed value of the recurrence element in a storage location of the FOM for use in a further iteration.

In a further aspect of the present invention, there is provided a computer program product for use in a computer system operatively coupled to a computer readable memory, the computer program product including a computer-readable data storage medium tangibly embodying computer readable program instructions for providing a method for optimizing source code to generate optimized source code having instructions for instructing a central processing unit (CPU) to iteratively compute values for a recurrence element, the CPU operatively coupled to fast operating memory (FOM) and operatively coupled to slow operating memory (SOM) for storing the generated optimized source code, wherein the generated optimized source code comprises instructions for instructing the CPU to store a computed value of the recurrence element in a storage location of the FOM for use in a further iteration.

In a further aspect of the present invention, there is provided an optimizer for generating optimized source code from source code including code for instructing a central processing unit (CPU) to compute a primary recurrence element, the CPU operatively coupled to fast operating memory (FOM) and slow operating memory (SOM) for storing the generated optimized source code, including means for replacing instructions to direct the CPU to store a computed value of the primary recurrence element in a storage location of the SOM with instructions to direct the CPU to place the computed value of the primary recurrence element in a storage location of the FOM, and means for inserting instructions to direct the CPU to consign a value of the primary recurrence element loaded in the storage location of the FOM to another storage location of the FOM.

In a further aspect of the present invention, there is provided a method for generating optimized source code from source code including code for instructing a central processing unit (CPU) to compute a primary recurrence element, the CPU operatively coupled to fast operating memory (FOM) and slow operating memory (SOM) for storing the generated optimized source code, the method including replacing instructions to direct the CPU to store a computed value of the primary recurrence element in a storage location of the SOM with instructions to direct the CPU to place the computed value of the primary recurrence element in a storage location of the FOM, and inserting instructions to direct the CPU to consign a value of the primary recurrence element loaded in the storage location of the FOM to another storage location of the FOM.

In a further aspect of the present invention, there is provided a computer program product for use in a computer system operatively coupled to a computer readable memory, the computer program product including a computer-readable data storage medium tangibly embodying computer readable program instructions for providing an optimizer for generating optimized source code from source code including code for instructing a central processing unit (CPU) to compute a primary recurrence element, the CPU operatively coupled to fast operating memory (FOM) and slow operating memory (SOM) for storing the generated optimized source code, including means for replacing instructions to direct the CPU to store a computed value of the primary recurrence element in a storage location of the SOM with instructions to direct the CPU to place the computed value of the primary recurrence element in a storage location of the FOM, and means for inserting instructions to direct the CPU to consign a value of the primary recurrence element loaded in the storage location of the FOM to another storage location of the FOM.

In a further aspect of the present invention there is provided a computer program product for use in a computer system operatively coupled to a computer readable memory, the computer program product including a computer-readable data storage medium tangibly embodying computer readable program instructions for providing a method for generating optimized source code from source code including code for instructing a central processing unit (CPU) to compute a primary recurrence element, the CPU operatively coupled to fast operating memory (FOM) and slow operating memory (SOM) for storing the generated optimized source code, the method including replacing instructions to direct the CPU to store a computed value of the primary recurrence element in a storage location of the SOM with instructions to direct the CPU to place the computed value of the primary recurrence element in a storage location of the FOM, and inserting instructions to direct the CPU to consign a value of the primary recurrence element loaded in the storage location of the FOM to another storage location of the FOM.

A better understanding of these and other aspects of the embodiments of the present invention can be obtained with reference to the following drawings and description of the preferred embodiments.

BRIEF DESCRIPTION OF THE DRAWINGS

The following figures are examples of the embodiments of the present invention, in which.

DETAILED DESCRIPTION OF THE PREFERRED EMBODIMENTS

It will be understood that for purposes of illustrating the embodiments of the present invention the drawings incorporate syntax related to the C computer programming language. However, the present invention is not limited to any particular type of computer programming language.

Computer-readable memory can be classified by the speed with which a CPU can access, manipulate, or operate the contents of the memory. Disk memory (such as floppy disks, hard drives, compact disks and the like) is the slowest type of memory that can be accessed by the CPU. Additionally, disk memory is economical and thus abundantly available. Main memory such as RAM (Random Access Memory) or ROM (Read Only Memory) can be accessed faster by the CPU compared to accessing disk memory. Cache memory can be accessed faster by the CPU compared to accessing main memory; however, there is a sub-classification of cache memory in which primary-level cache is the fastest type of cache memory that the CPU can access compared to accessing second-level cache memory or accessing third-level cache memory. Hardware registers are the fastest type of memory that can be accessed by the CPU; however, hardware registers are expensive to implement. It will be understood that computer-readable instructions that direct the CPU to access slow operating memory (that is disk memory or main memory) require significantly more computer processing time to execute than instructions that direct the CPU to access fast operating memory (that is cache memory or hardware registers). Therefore, it would be advantageous to provide instructions to direct the CPU to access fast operating memory (such as hardware registers or cache memory) more frequently than directing the CPU to access slow operating memory (such as disk memory or main memory).

Figure 1:
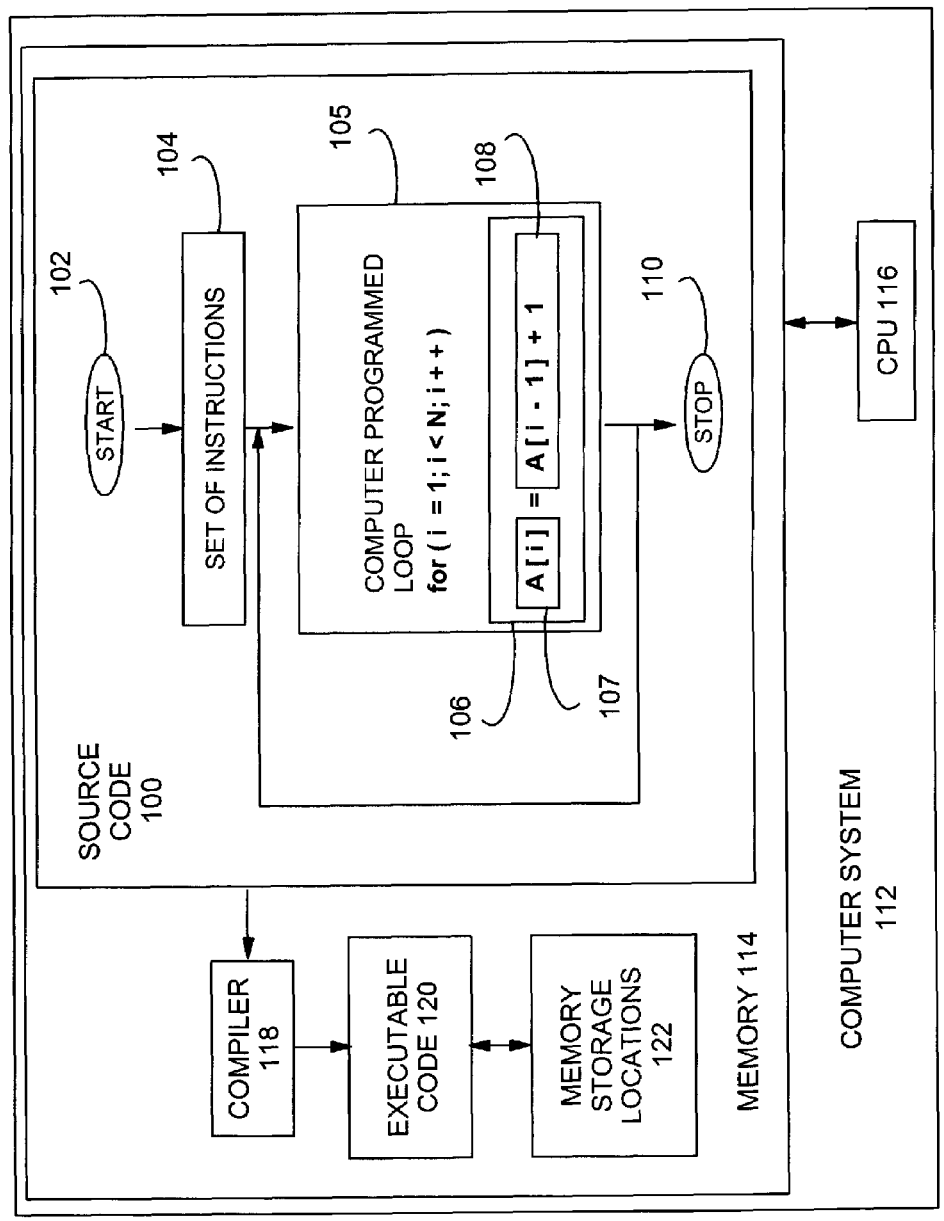
FIG. 1 depicts a computational environment for executing unoptimized executable code for directing a CPU to execute a computer program programmed loop.
Figure 2:
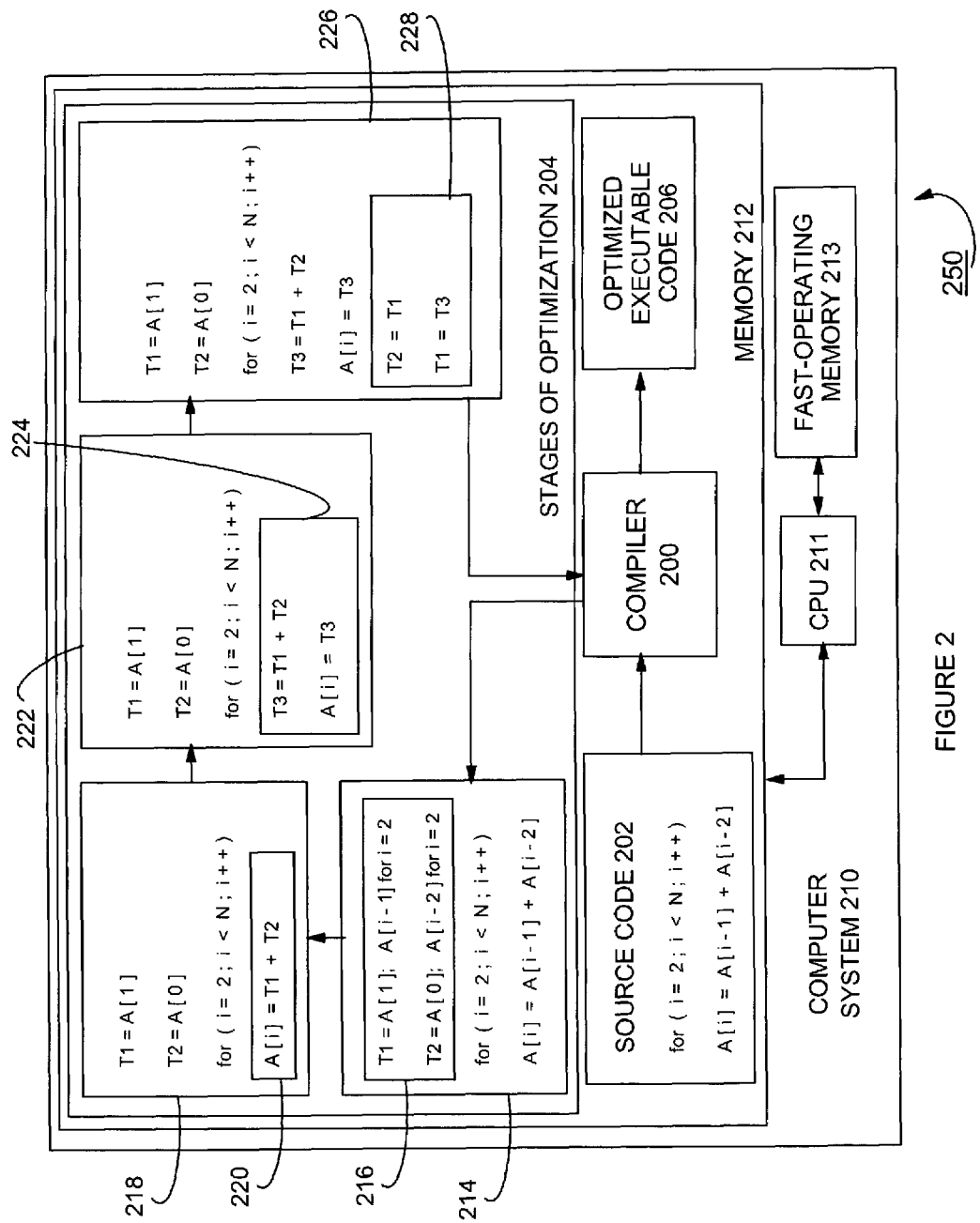
FIG. 2 depicts a compiler embodying the present invention for generating optimized executable code for directing a CPU to execute a computer programmed loop.

Referring to FIG. 2, there is depicted computing environment 250 including compiler 200 embodying aspects of the present invention. Compiler 200 includes an optimization module for optimizing source code. Computing environment 250 also includes computer system 210 having CPU 211 operatively coupled to slow operating memory 212 and fast operating memory 213.

Stored or residing in memory 212 at times during operation of computer system 210 is compiler 200, source code 202, block 204 (including code optimized at various stages of optimization), and optimized executable code 206 generated from optimized source code provided by the optimizer module of compiler 200. Source code 202 includes a computer programmed loop. A user directs compiler 200 (which includes embodied aspects of the present invention) to compile source code 202 for generating optimized executable code 206. The optimizer module (not depicted) of compiler 200 optimizes source code 202 to generate various stages of optimization as depicted in block 204. The task of optimizing source code 202 is described below. It will be understood that the task of optimizing includes rearranging instructions, adding instructions, and/or removing instructions related to source code 202.

Source code 202 includes a computer programmed loop including an induction variable "i" having an induction value. The programmed loop includes computer-readable programmed instructions for computing data. For example, the instructions depicted in source code 202 will be used by CPU 211 for iteratively computing numerical values of array elements. Optimized executable code 206 directs or instructs CPU 211 to achieve specific computational tasks as will be described below.

In the preferred embodiment, memory 212 includes RAM or other slow operating computer-readable memory (such as disk memory) operationally coupled to CPU 211. Also coupled to CPU 211 is fast operating memory which includes a set of hardware registers.

Compiler 200 reads source code 202, optimizes source code 202 (resulting in the various optimization stages depicted in block 204—that is stages 214, 218, 222, 226) and then generates optimized executable code 206. When executed by CPU 211, optimized executable code 206 instructs CPU 211 to perform load/read instructions associated with each computational iteration of the computer programmed loop that involve fast operating memory. In the preferred embodiment, optimized executable code 206 instructs CPU 211 to use hardware registers (not depicted) operationally coupled to CPU 211 for loading/reading computed data associated with each iterative step of the optimized computer programmed loop (depicted in block 226). In another preferred embodiment, optimized executable code 206 instructs CPU 211 to use cache memory (not depicted) operationally coupled to CPU 211 for loading/reading computed data associated with each iterative step of the computer programmed loop.

Source code 202 instructs or directs CPU 211 to iteratively (that is repeatedly) execute computational instructions of a computer programmed loop by "N−2" iterative steps. During the execution of the computer programmed loop, an induction variable 'i' starts with a numerical value of '2', increases by a numerical value of '1' for each iterative step, and ends with a numerical value of 'N−1'. When i=(N−1), a branch condition is satisfied (in which i<N) and CPU 211 stops further iterative executions of the computer programmed loop of source code 202. The computer programmed loop of source code 202 has a recurrence length of "3", where recurrence length is the number of recurrence elements used in a programmed loop. Each recurrence element has a corresponding numerical value for each iterative step of the computer programmed loop. For example, recurrence elements of source code 202 are A[i], A[i−1], and A[i−2]. Recurrence elements are values which are re-computed for each iterative step of a computation process. An example of a computation process which re-computes values of recurrence elements is a computer programmed loop which computes various array elements (which act like recurrence elements) for each step of the loop.

The following description identifies recurrence elements for the case when the induction value of the induction variable "i" increases with each iterative step of a computer programmed loop having recurrence elements A[i], A[i−1], A[i−2]. A largest or highest recurrence element (that is, for example, A[i]) is called a primary feeder or primary recurrence element. The remaining recurrence elements are called in descending order, such as a secondary recurrence element A[i−1] and a tertiary recurrence element A[i−2], etc; or are simply called subsequent recurrence elements A[i−1] and A[i−2], etc.

The following description identifies recurrence elements for the case when the induction value of the induction variable "i" decreases for each iterative step of a computer programmed loop having recurrence elements A[i], A[i+1], A[i+2]. A primary feeder or primary recurrence element is array element A[i]. The remaining recurrence elements are called in descending order, such as a secondary recurrence element A[i+1] and a tertiary recurrence element A[i+2], etc; or are simply called subsequent recurrence elements A[i+1] and A[i+2], etc.

Referring to the exemplary source code 202, since the induction variable "i" increases for each iterative step, the primary feeder is array element A[i], the secondary feeder is array element A[i−1], and the tertiary feeder is array element A[i−2]. Alternatively, subsequent recurrence elements are array elements A[i−1] and A[i−2].

Compiler 200 begins to optimize source code 202 by identifying a computer programmed loop, identifying the induction variable associated with the identified computer programmed loop, determining primary and subsequent recurrence elements associated with the identified induction variable, and converting instructions related to the identified computer programmed loop for the case when compiler 200 identifies a recurrence pattern. The recurrence pattern interrelates the recurrence elements. Once the recurrence pattern is identified, source code 202 is optimized and is depicted at various stages depicted in blocks 214, 218, 222, and 226. The manner in which source code 202 is optimized (prior to generating optimized executable code 206) will be described below.

Figure 3:
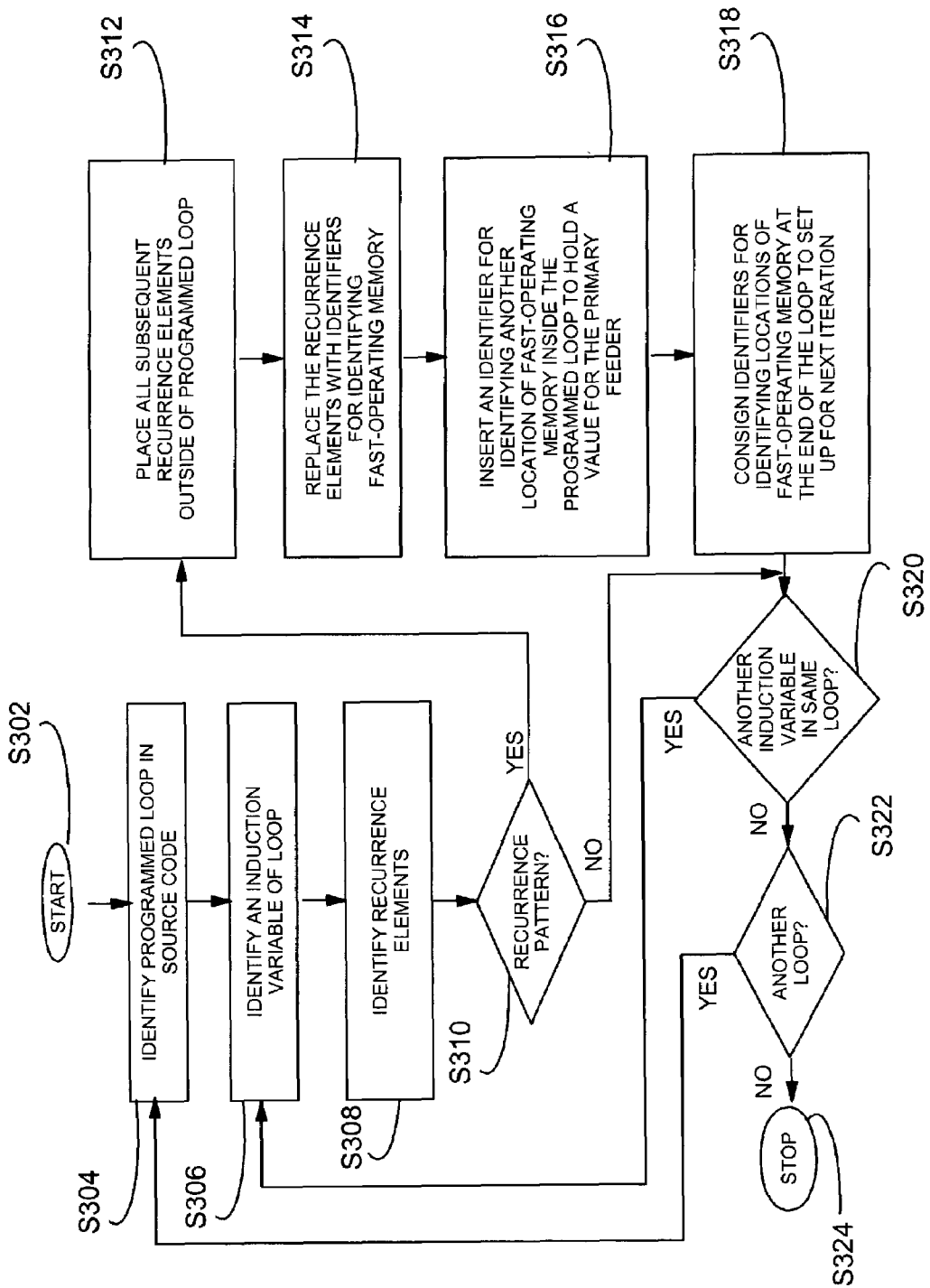
FIG. 3 depicts operations of the compiler of FIG. 2.

Referring to FIG. 3, there is depicted operations of compiler 200 of FIG. 2. The operations depicted in flowchart 300 are performed by compiler 200 unless stated otherwise.

S302 indicates the start of operations of compiler 200. In S304, compiler 200 identifies a computer programmed loop in source code 202. Compiler 200 identifies the induction variable related to the identified computer programmed loop (S306). Compiler 200 identifies a set of recurrence elements related with the identified induction variable (S308).

In S310, compiler 200 ascertains whether the identified set of recurrence elements are related by a recurrence pattern. The recurrence pattern includes a primary recurrence element and includes at least one subsequent recurrence element (either secondary, tertiary, etc), and the recurrence elements use the same induction variable. Compiler 200 determines whether the computer programmed loop includes a primary recurrence element and subsequent recurrence elements. If compiler 200 detects the primary and subsequent recurrence elements are not included in the computer programmed loop, processing continues to S320 in which compiler 200 attempts to identify another induction variable that may exist in the identified loop of code source 202. If compiler 200 detects that the primary and subsequent recurrence elements are included in the computer programmed loop, processing continues to S312 in which instructions related to the computer programmed loop are converted into instructions related to block 214. Referring to source code 202, since compiler 200 identifies a recurrence pattern "A[i], A[i−1], A[i−2]", and the primary recurrence element is "A[i]" and the subsequent recurrence elements (also known as feeders) are "A[i−1], A[i−2]", then compiler 200 generates the instructions related to block 214. Referring to block 214, compiler 200 locates or places initial instances (values) of subsequent recurrence elements outside of the identified programmed loop. The primary recurrence element remains in the computer programmed loop. Initial values of subsequent recurrence elements "A[i−1]" and "A[i−2]" are placed outside or immediately before commencement of the identified computer programmed loop. Relocated subsequent recurrence elements are depicted in block 216. Primary recurrence element 'A[i]' remains in the programmed loop. In block 214, instruction identifiers for identifying the contents of locations in fast operating memory (such as hardware registers T1 and T2)

are equated to values of the subsequent recurrence elements for the case when the induction value of the induction variable is equal to the start value of a first iteration or iterative step. For the depicted example, the initial numerical value of the induction variable is "2" because the value of the induction variable starts with a numerical value of "2" in the computer programmed loop. Then initial values are computed for registers T1 and T2 for "i"=2, as depicted in block 216. Initial numerical values for T1 and T2 are A[1] and A[0] respectively. Operation S312 converts instructions related to source code 202 to instructions related to block 214.

Referring to operation S314, compiler 200 replaces the recurrence elements with instruction identifiers for identifying hardware registers inside the identified computer programmed loop. Block 218 includes block 220 having instructions inside the computer programmed loop modified in which the recurrence elements have been replaced by the instruction identifiers for identifying locations of contents in fast operating memory (such as hardware registers and the like). In block 220, compiler 200 has replaced occurrences of the recurrence elements (that are located inside or within the computer programmed loop) with instruction identifiers for identifying hardware registers T1 and T2. Operation S314 converts instructions related to block 214 to instructions related to block 218.

Referring to operation S316, compiler 200 inserts another instruction identifier for identifying a location on fast operating memory inside or within the identified programmed loop to hold a value for the primary feeder or primary recurrence element. Referring to block 222, the primary recurrence element A[i] is assigned to another location in fast operating memory (such as a third hardware register) T3 in which T3 is equated to the computational operation of T1+T2 (as depicted in block 224). Operation S316 converts instructions related to block 218 to instructions related to block 222.

In S318, compiler 200 consigns values of instruction identifiers for identifying locations of contents in fast operating memory at end of the computer programmed loop to set up computation operations for a next iteration step of the computer programmed loop. Referring to block 228, the value of register T2 is updated to equal the value of register T1, and then the value of register T1 is updated to equal the value of register T3. For the next iteration, the values of registers T2 and T1 will be included when computing the value related to register T3. This operation prevents several store/write operations for subsequent iteration steps of the computer programmed loop. Operation S318 converts instructions related to block 222 to instructions related to block 226.

In S320, compiler 200 determines whether there is another induction variable in an identified computer programmed loop. If compiler 200 detects another induction variable in the identified computer programmed loop, processing continues to S306 in which case instructions related to a newly identified induction variable are optimized. If compiler 200 detects no other induction variable in the identified computer programmed loop, processing continues to S322.

In S322, compiler 200 determines whether source code 202 includes another computer programmed loop. If compiler 200 detects the presence of another computer programmed loop, processing continues to S304 in which case compiler 200 further optimizes instructions related to a newly identified computer programmed loop. If compiler 200 does not detect the presence of any other computer programmed loop, operation continues to S324 in which case compiler 200 stops optimizing source code 202 and begins operations for compiling instructions related to block 226 to generate optimized executable code 206.

Special care must be taken when memory is aliased. Aliased memory is memory shared with other tasks. The contents of the aliased memory may change in unexpected ways if due care is not taken. To prevent aliasing memory, memory should be reserved for performing programmed loops or special attention should be paid to ensuring values in memory are not rendered corrupt by memory aliasing problems caused by other tasks that use the shared aliased memory. Unchecked aliased memory may corrupt values of a recurrence pattern. That is, operation S308 should ensure that the memory is protected so that unpredictable changes in the values of the recurrence elements do not occur. Memory sharing or aliasing may require that the recurrence values be transferred between memory (that is slow operating memory) and fast operating memory (in which case the recurrence values are not kept constantly in fast operating memory).

Figure 4:
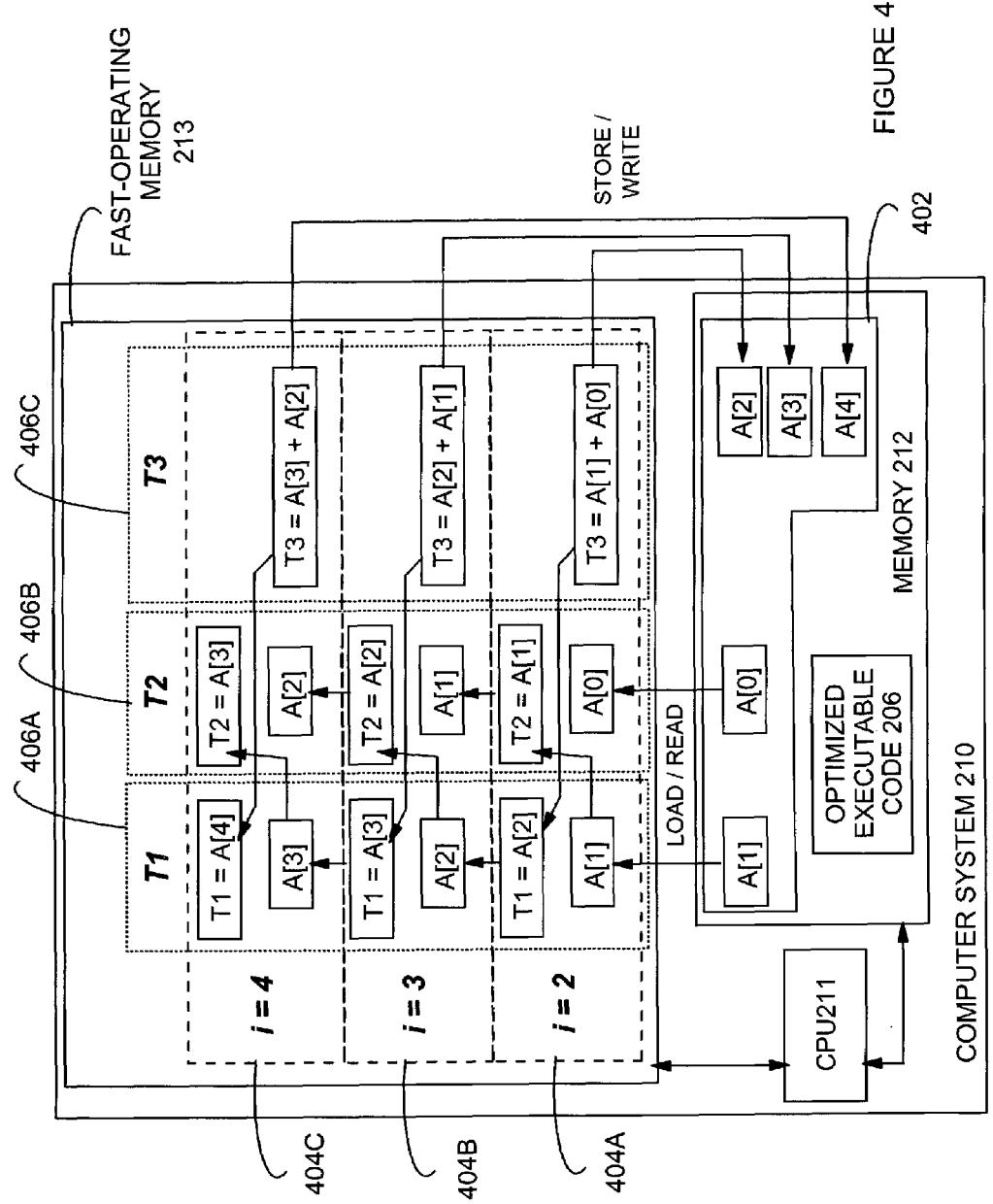
FIG. 4 depicts CPU of FIG. 2 executing the optimized code of FIG. 2.

Referring to FIG. 4, there is depicted the computing environment of FIG. 2 in which CPU 211 is ready to execute optimized executable code 206 for computing values related to a computer programmed loop included in optimized executable code 206. Subsequent load/read instruction operations in each iteration step of the computer programmed loop are performed in fast operating memory 213. By using fast operating memory 213 for each iterative step, CPU 211 avoids executing load/read operations for transferring numerical values from slow operating memory 212 to fast operating memory 213 for each subsequent iterative step of the computer programmed loop. It will be appreciated that transfer operations (that is store/write or load/read operations) for transferring numerical values from a fast operating memory 213 to another fast operating memory 213 is performed faster than transfer operations for transferring numerical values from a storage location in slow operating memory 212 to another storage location in slow operating memory 212.

Slow operating memory 212 includes memory portion 402 having various memory storage locations for storing numerical values for array elements A[1], A[2], . . . , A[i]. Memory storage locations are depicted for containing values for array elements A[1] to A[4].

In the preferred embodiment, fast operating memory 213 includes units of fast operating memory depicted as T1, T2, and T3. Registers T1, T2, and T3 are depicted in columns 406A, 406B, and 406C, respectively, to illustrate the changing values stored in the hardware registers for several iterative steps related to a programmed loop (for "i"=2, 3, and 4). Rows 404A, 404B, and 404C depict the values of hardware registers T1, T2, and T3 for several iterative values of induction variable "i" (that is the iterative steps in which 'i' starts at '2', then steps to '3', and then steps to '4').

When executable code 206 is executed by CPU 211, CPU 211 performs a load/read operation to transfer a value of A[0] and A[1] from memory 406 to hardware registers T2 and T1 respectively. The transfer of A[1] and A[0] into contents of the hardware registers is depicted in row 404A and columns 406A, 406B respectively.

The computer programmed loop is ready to be executed by CPU 211 from "i"=2 to "i"=(N−1). For the case when "i"=2, a numerical value for T3 is computed, in which T3=T1+T2=A[1]+A[0]. Then, a store/write operation is performed by CPU 211 in which the value stored in T3 is transferred from hardware register T3 to a memory storage location in memory storage 402 for storing the value of array element A[2]. Referring to the intersection of column 406B and row 404A, the value (that is A[1]) of hardware register T1 is consigned to hardware register T1 (by the instruction T2=T1=A[1]). Referring to the intersection of column 406A and row 404A, the value (that is A[2]) of hardware register T3 is consigned to hardware register T1 (by the instruction T1=T3=A[2]).

Referring to block 226, for the next iterative step in which "i"=3, a numerical value for hardware register T3 is computed, in which the value of register T3 is set to the sum of registers T1 and T2 which is the sum of A[2]+A[1] (by the instruction T3=T1+T2) which is depicted in the intersection of row 404B and column 406C. The value of hardware register T3 is stored/written to memory location for containing a value for array element A[3] in memory 402 as directed by instruction A[3]=T3. Values of hardware registers T3 and T1 are consigned to registers T1 and T2 respectively (by instructions T2=T1 and T1=T3) which is depicted in row 404B, columns 406A, 406B respectively.

For the next iterative step in which "i"=4, a numerical value for hardware register T3 is computed, in which the value of register T3 is set to the sum of registers T1 and T2 which is the sum of A[3]+A[4] (by instruction T3=T1+T2) which is depicted in the intersection of row 404C and column 406C. The value of hardware register T3 is stored/written to memory location for containing a value for array element A[4] in memory 402 as directed by instruction A[4]=T3. Values of hardware registers T3 and T1 are consigned to registers T2 and T1 respectively for use by the next iterative step of the programmed loop (by instructions T2=T1 and T1=T3) which is depicted in row 404C and columns 406A, 406B respectively.

Figure 5:
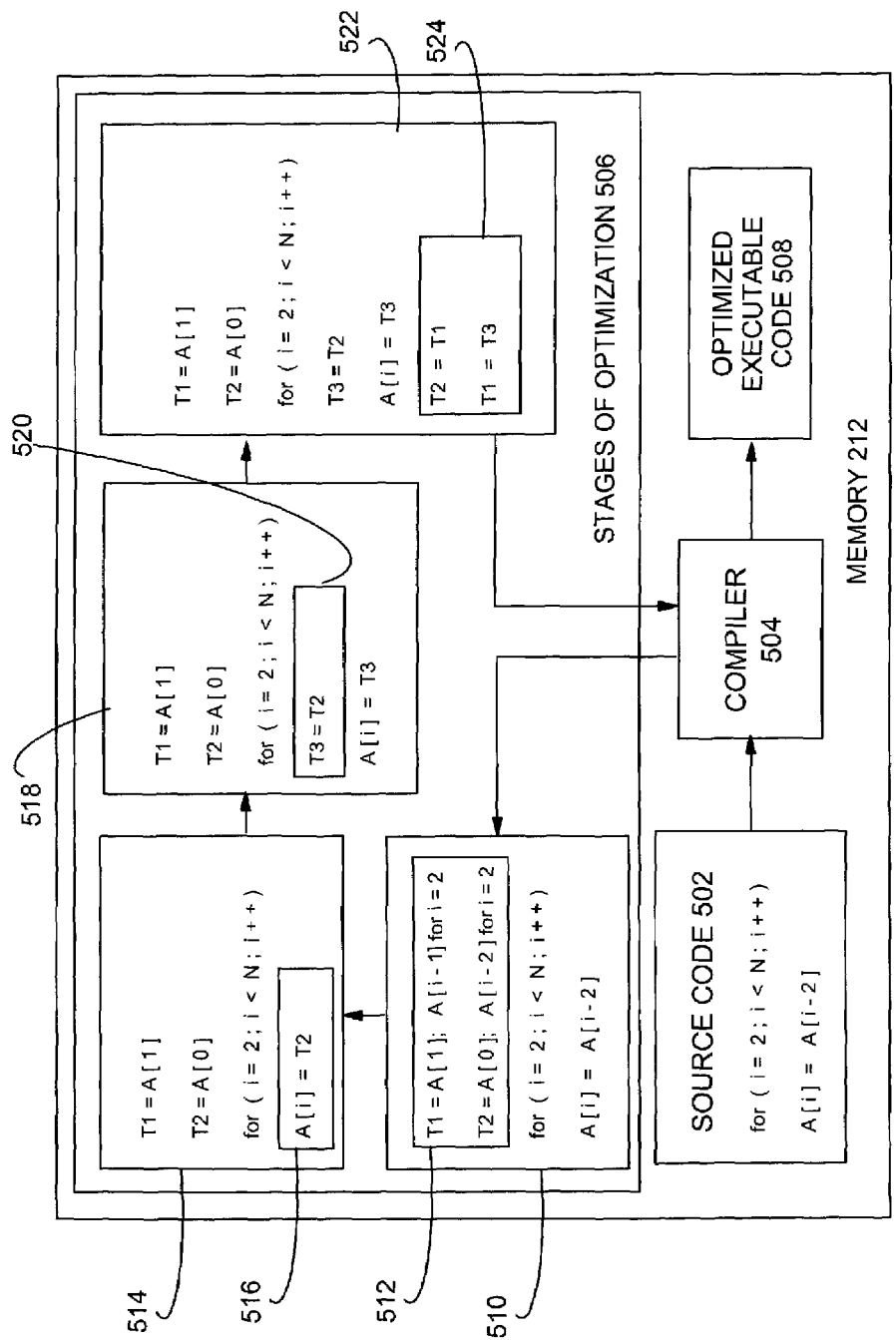
FIG. 5 depicts a second compiler embodying the present invention.

Referring to FIG. 5, there is depicted source code 502 having a recurrence element missing from the computation of array A[i] for each iterative step. Source code 502 is used as an example of how an aspect of the present invention can be used for handling recurrence elements which are missing from source code. Source code 502 depicts a missing secondary recurrence element. Even though a recurrence element is missing, the number of hardware registers required for iteratively computing the primary recurrence element is still equal to the recurrence length. For source code 502, the recurrence length is "3" and hence three hardware registers are required. For each iteration of "i" a value for the secondary recurrence element is still required so that for each iterative step computation can be completed for any remaining recurrence elements. The transformation of blocks 510, 514, 518, 522 and 524 is achieved by having compiler follow the operations depicted in flowchart 300 of FIG. 3.

Figure 6:
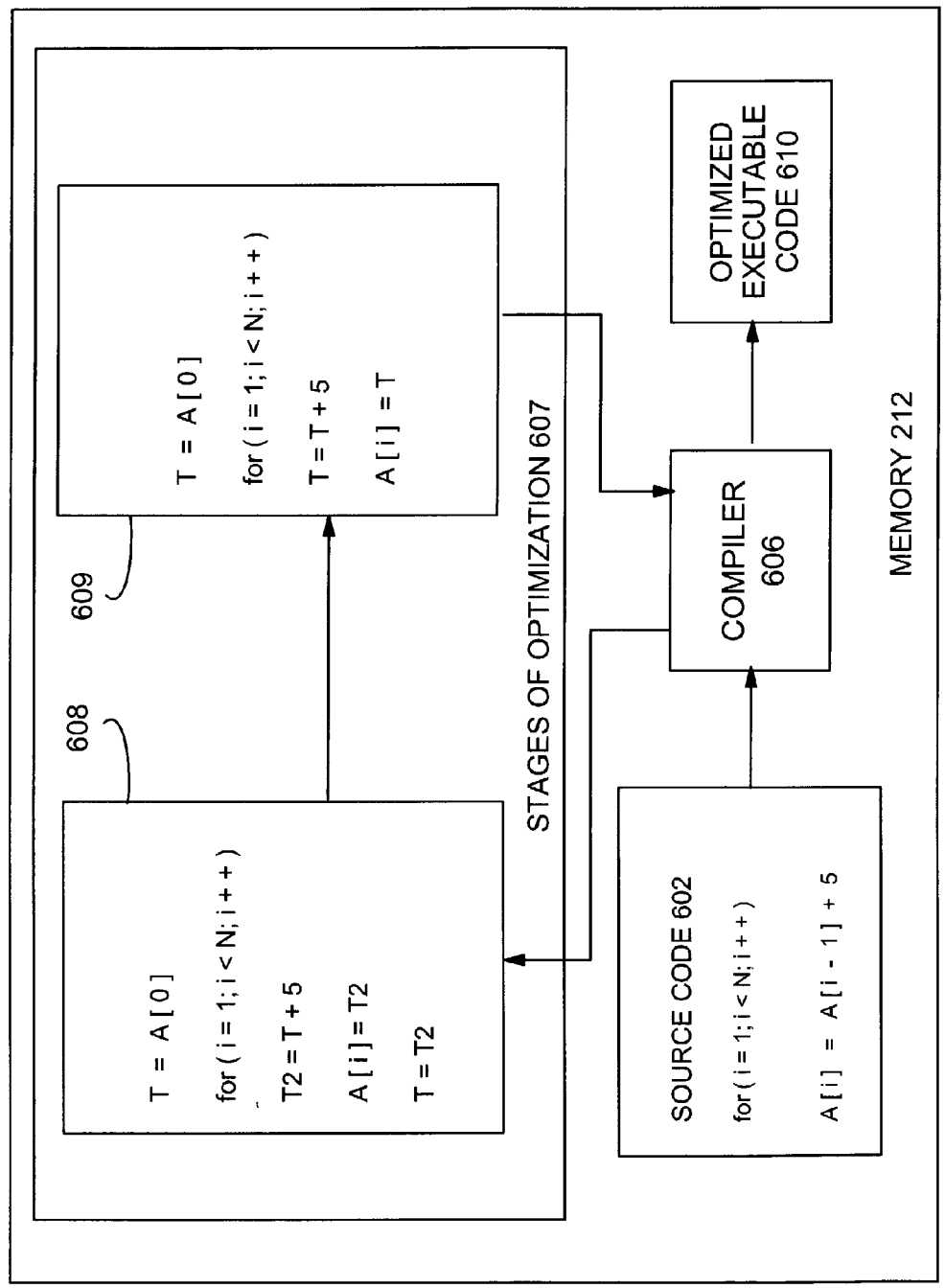
FIG. 6 depicts a third compiler embodying the present invention.

Referring to FIG. 6, there is depicted memory 212 for storing source code 602 having a computer programmed loop, compiler 606, various stages of optimization 607, and optimized executable code 610. Compiler 606 includes an optimization module (not depicted) for optimizing source code 602. Stages of optimization 607 depicts optimized source code 608 and 609 each having optimized instructions. For the case when a user executes compiler 606, compiler 606 optimizes instructions related to source code 602 to generate optimized source code 609, and then compiles optimized source code 609 to generate optimized executable code 610. Source code 602 includes a computer programmed loop having a recurrence length of "2" and there is a primary and a secondary recurrence element A[i] and A[i−1] respectively.

For the case when compiler 606 uses the operations depicted in flowchart 300 of FIG. 3, compiler 606 optimizes source code 602 to generate optimized source code 608. Once optimized source code 608 is generated, compiler 606 further optimizes optimized source code 608 to generate optimized source code 609. It will be appreciated that an enhancement can be achieved in operations by reducing the number of copy operations when the value of register T2 is not required after its initial use in the loop. This improvement (minimizing the number of hardware registers) can be realized during the optimization of the instructions by following flowchart 300 of FIG. 3 or through a subsequent optimization phase. The optimization module of compiler 606 involves using a minimum number of storage locations of said fast operating memory.

Figure 7:
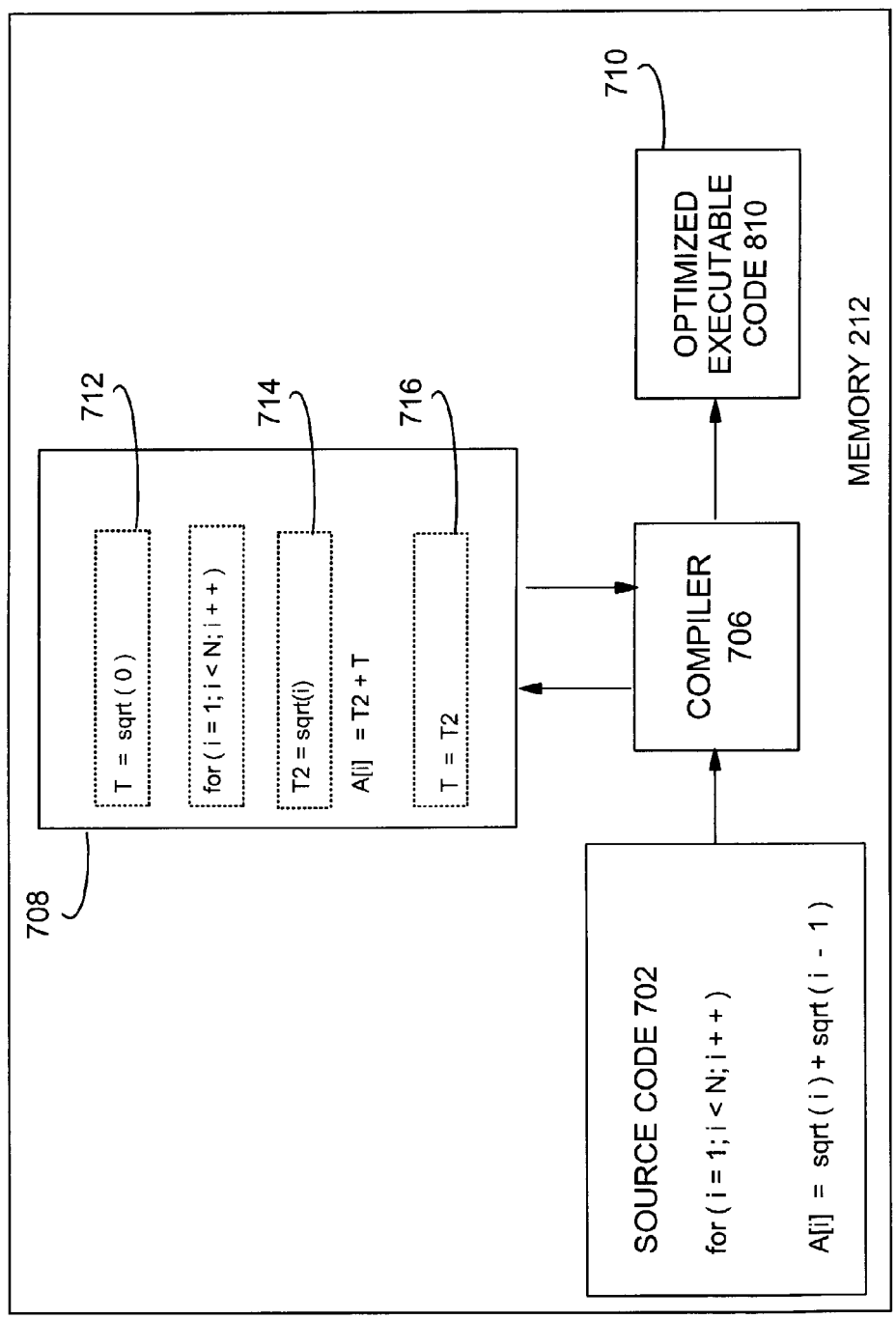
FIG. 7 depicts a fourth compiler embodying the present invention.

Referring to FIG. 7, there is depicted source code 702 for computing a function, such as a square root function. Memory 212 stores source code 702 having a computer programmed loop, compiler 706, optimized source code 708, and optimized executable source code. Compiler 706 optimizes source code 702 to generate optimized source code 708, and then compiles optimized source code 708 to generate optimized executable source code 710. The computer programmed loop includes a recurrence length of "2", and a primary and a secondary recurrence element.

Referring to optimized source code 708, the instructions related to block 712 will perform a single function call before execution of a computer programmed loop. Instructions related to block 714 depicts for each iterative step of the computer programmed loop, a single function call will be performed to compute the value of A[i]. The instructions related to block 716 depicts that for each iterative step of the programmed loop, the next value of the recurrence element is to be computed. It will be appreciated that a function call has been eliminated from each iterative step. It will be appreciated that recurrence elements are not restricted to array references. The optimizer module of compiler 706 is used for source code that directs the CPU to compute recurrence elements from a function call.

Figure 8:
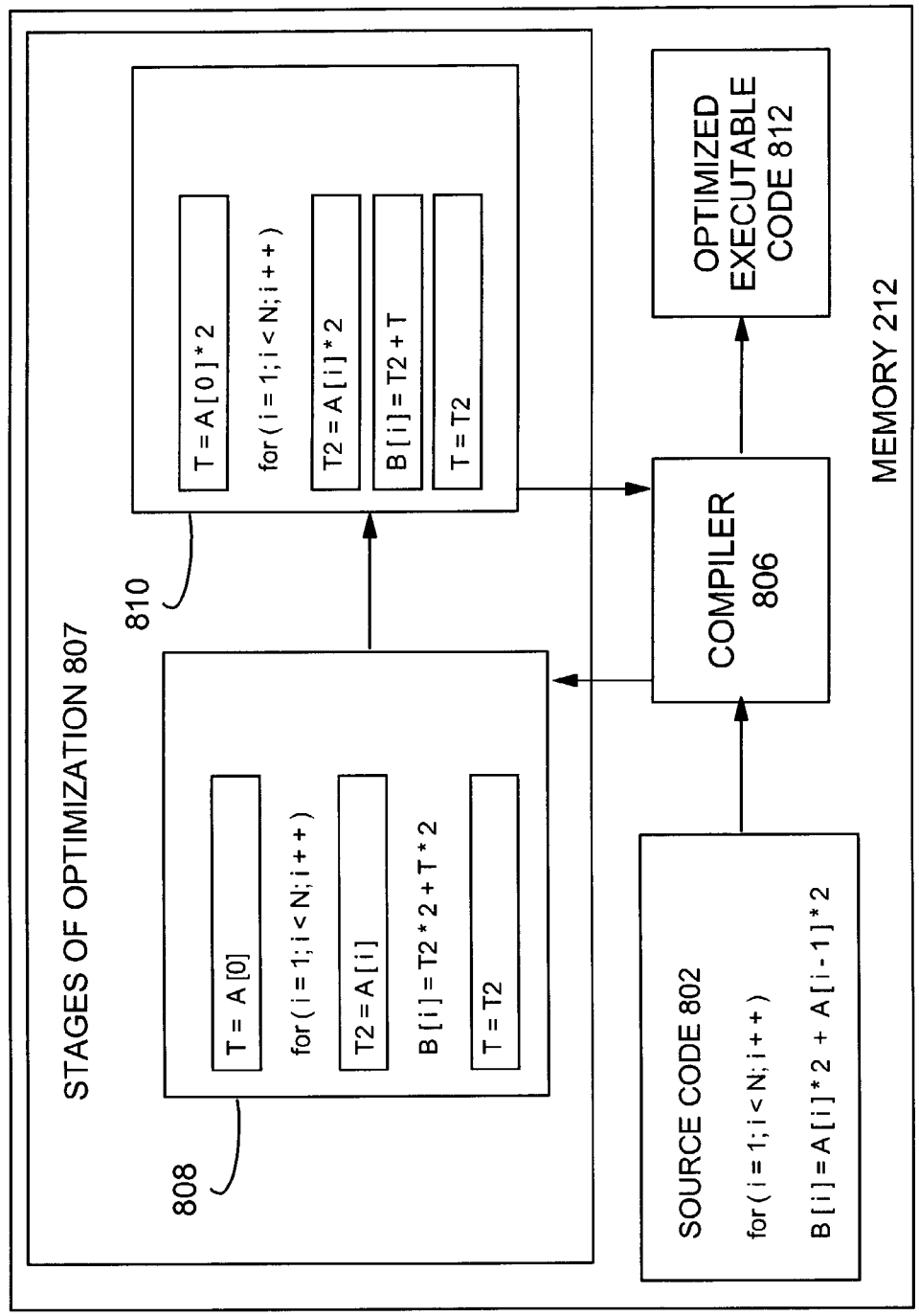
FIG. 8 depicts a fifth compiler embodying the present invention.

Referring to FIG. 8, there is depicted memory 212 storing source code 802, compiler 806 (including an optimizer module which is not depicted), stages of optimization 807, and optimized executable code 812. Stages of optimization 807 includes optimized source code 808 and 810 formed by compiler 806. For the case when a user executes compiler 806, compiler 806 optimizes source code 802 to generate optimized source code 808, further optimizes optimized source code 808 to generate optimized source code 810, and then compiles optimized source code 810 to generate optimized executable code 812.

Source code 802 includes instructions for a second-order computation of a recurrence element. Previous embodiments depicted computing a first-order computation of the recurrence element. Optimized source code 808 depicts instructions optimized for a first-order correction (that is the elimination of a load/read operation). Optimized source code 810 depicts optimized instructions for a second-order correction.

Additional operations beyond the operations depicted in flowchart 300 of FIG. 3 are needed. After operation S310 (that is identifying a recurrence pattern), compiler 806 finds any loop invariant computation applied to all recurrence elements. Operation S312 is replaced with the following operation: compiler 806 places all recurrence elements and loop invariant computation on them outside of computer programmed loop. The replacement operation replaces the recurrence element and loop invariant computation, and the insertion operation holds the value of the primary feeder and any identified loop invariant computation on it.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An optimizer stored within a memory of a computer system for optimizing source code, comprising:
   means for generating the optimized source code having first instructions for instructing a central processing unit (CPU) to iteratively compute values for a recurrence element, said CPU operatively coupled to fast operating memory (FOM) and operatively coupled to slow operating memory (SOM) for storing said generated optimized source code, wherein said recurrence element is a primary recurrence element;
   means for generating the optimized source code having second instructions for instructing said CPU to store a computed value of said recurrence element in a storage location of said FOM for use in a further iteration; and
   means for generating said generated optimized source code having third instructions for instructing said CPU to consign, for use in a further iteration step, said computed value of said primary recurrence element from said storage location to another storage location of said FOM.

2. The optimizer of claim 1 further comprising means for causing said CPU to iteratively compute values for a subsequent recurrence element, and means for generating optimized source code having fourth instructions for instructing said CPU to compute a value of said primary recurrence element using a computed value of said subsequent recurrence element located in other storage locations of said FOM.

3. The optimizer of claim 1 wherein said another storage location contains at least one subsequent recurrence element.

4. The optimizer of claim 2 further comprising means for generating said optimized source code having fifth instructions for instructing said CPU to load an initial value of said subsequent recurrence element from said SOM to said FOM prior to computing an initial value of said primary recurrence element.

5. The optimizer of claim 2 wherein said subsequent recurrence element is a secondary recurrence element.

6. An optimizer stored within a memory of a computer system for optimizing source code to generate optimized source code having instructions for instructing a central processing unit (CPU) to iteratively compute values for a primary recurrence element and subsequent recurrence elements, said CPU operatively coupled to fast operating memory (FOM) for storing values of said primary recurrence element and for storing values of said subsequent recurrence elements, said CPU operatively coupled to slow operating memory (SOM) for storing said generated optimized source code, wherein said generated optimized source code comprises instructions for instructing said CPU to:
   store a computed value of said primary recurrence element:
      in a storage location of said FOM for use in a further iteration; and
      in a storage location of said SOM;
   consign, for use in said further iteration step, said computed value of said primary recurrence element from said location another storage location of said FOM;
   compute a value of said primary recurrence element using a computed value of said subsequent recurrence element located in other storage locations of said FOM; and
   load an initial value of said subsequent recurrence elements from said SOM to said FOM prior to computing an initial value of said primary recurrence element.

7. The optimizer of claim 6 wherein said optimized source code further comprises instructions for instructing said CPU to store said computed value of said primary recurrence element in said SOM.

8. The optimizer of claim 7 wherein said computed value of said primary recurrence element is stored for each iterative computation of said primary recurrence element.

9. The optimizer of claim 2 wherein said computed value of said subsequent recurrence element is a computed value of said primary recurrence element.

10. The optimizer of claim 6 wherein said SOM is main memory, and said FOM is selected from the group comprising:
    hardware registers; and
    cache memory.

11. The optimizer of claim 1 comprising means for compiling said generated optimized code to generate executable optimized executable code.

12. The optimizer of claim 6 wherein said source code includes a computer programmed loop for directing said CPU to alternately execute load/read and store write instructions for transferring computed values of said recurrence elements between said low-operating memory and said fast operating memory.

13. The optimizer of claim 12 wherein said computer programmed loop includes an induction variable for assisting said CPU to compute said recurrence elements.

14. The optimizer of claim 1 wherein said source code directs said CPU to compute a recurrence element from a function call.

15. A method for optimizing source code, comprising:
    instructing, by optimized source code, in a first source code instruction, a central processing unit (CPU) to iteratively compute values for a recurrence element, wherein said recurrence element is a primary recurrence element;
    instructing, by said optimized source code, in a second source code instruction, the CPU to store a computed value of said recurrence element in a storage location of fast operating memory (FOM) for use in a further iteration by replacing said recurrence element with an instruction identifier for identifying a particular storage location within said FOM, wherein said CPU is operatively coupled to said FOM and operatively coupled to slow operating memory (SOM) for storing said optimized source code; and
    consigning, by said optimized source code, in a third source code instruction, for use in a further iteration step, said computed value of said primary recurrence element from said storage location to another storage location of said FOM.

16. The method of claim 15 wherein said optimized source code is compiled and executed as machine code on said CPU.

17. The method of claim 15 further comprising:
    instructing, by said optimized source code, in a fourth source code instruction, said CPU to:

iteratively compute values for a subsequent recurrence element; and compute a value of said primary recurrence element using a computed value of said subsequent recurrence element located in other storage locations of said FOM.

18. A method for instructing a central processing unit (CPU) to iteratively compute values for a primary recurrence element and subsequent recurrence elements, said method is performed by optimized source code, said CPU is operatively coupled to said FOM and operatively coupled to slow operating memory (SOM) for storing said optimized source code, comprising:

storing a computed value of a primary recurrence element in a storage location of fast operating memory (FOM) for use in a further iteration;

consigning, for use in a further iteration step, said computed value of said primary recurrence element from said storage location to another storage location of said FOM;

iteratively computing values for said subsequent recurrence elements; and computing a value of said primary recurrence element using a computed value of said subsequent recurrence elements located in other storage locations of said FOM.

19. The method of claim 18 wherein said another storage location contains at least one subsequent recurrence element.

20. The method of claim 18 further comprising loading an initial value of said subsequent recurrence element from said SOM to said FOM prior to computing an initial value of said primary recurrence element.

21. The method of claim 18 wherein said subsequent recurrence element is a secondary recurrence element.

22. The method of claim 18 further comprising storing said computed value of said primary recurrence element in said SOM.

23. The method of claim 22 wherein said computed value of said primary recurrence element is stored for each iterative computation of said primary recurrence element.

24. The method of claim 21 wherein said computed value of said subsequent recurrence element is a computed value of said primary recurrence element.

25. The method of claim 18 wherein said SOM is main memory, and said FOM is selected from the group comprising:

hardware registers; and cache memory.

26. The method of claim 18 further comprising compiling said generated optimized code to generate executable optimized executable code.

27. The method of claim 18 wherein said source code includes a computer programmed loop for directing said CPU to alternately execute load/read and store write instructions for transferring computed values of said recurrence elements between said low-operating memory and said fast operating memory.

28. The method of claim 27 wherein said computer programmed loop includes an induction variable for assisting said CPU to compute said recurrence elements.

29. The method of claim 18 wherein said source code directs said CPU to compute a recurrence element from a function call.

30. A computer program product for use in a computer system operatively coupled to a computer readable memory, the computer program product including a computer-readable data storage medium tangibly embodying computer readable program instructions for providing an optimizer, comprising:

first instructions for instructing a central processing unit (CPU) to iteratively compute values for a recurrence element, said CPU operatively coupled to fast operating memory (FOM) and operatively coupled to slow operating memory (SOM) for storing said generated optimized source code, wherein said recurrence element is a primary recurrence element; and second instructions for instructing said CPU to store a computed value of said recurrence element in a storage location of said FOM for use in a further iteration; and third instructions for instructing said CPU to consign, for use in a further iteration step, said computed value of said primary recurrence element from said storage location to another storage location of said FOM.

31. A computer program product for use in a computer system operatively coupled to a computer readable memory, the computer program product including a computer-readable data storage medium tangibly embodying computer readable program instructions for providing a method comprising:

instructing a central processing unit (CPU) to iteratively compute values for a primary recurrence element and subsequent recurrence elements, said CPU is operatively coupled to said FOM and operatively coupled to slow operating memory (SOM) for storing said optimized source code;

storing a computed value of the primary recurrence element in a storage location of fast operating memory (FOM) for use in a further iteration;

consigning, for use in a further iteration step, said computed value of said primary recurrence element from said storage location to another storage location of said FOM;

iteratively computing values for said subsequent recurrence elements; and computing a value of said primary recurrence element using a computed value of said subsequent recurrence elements located in other storage locations of said FOM.

32. An optimizer stored within a memory of a computer system for generating optimized source code from source code including code for instructing a central processing unit (CPU) to compute a primaly recurrence element, said CPU operatively coupled to fast operating memory (FOM) and slow operating memory (SOM) for storing said generated optimized source code, comprising:

means for replacing instructions to direct said CPU to store a computed value of said primary recurrence element in a storage location of said SOM with instructions to direct said CPU to place said computed value of said primary recurrence element in a storage location of said FOM; and means for inserting instructions to direct said CPU to consign a value of said primary recurrence element loaded in said storage location of said FOM to another storage location of said FOM.

33. The optimizer of claim 32 wherein said source code includes code for instructing said CPU to a compute value of a subsequent recurrence element.

34. The optimizer of claim 32 wherein said means for inserting instructions further includes inserting an instruction to direct said CPU to store a value of a recurrence element loaded in said FOM memory to said SOM.

35. The optimizer of claim 32 wherein said means for inserting instructions further includes inserting an instruction to direct said CPU to load initial values of said subsequent recurrence elements from said SOM to said FOM.

36. The optimizer of claim 32 further comprising means for compiling said optimized code to generate executable optimized executable code.

37. The optimizer of claim 32 wherein said source code includes a computer programmed loop for directing said CPU to alternate execution of load/read and store write instructions for transferring computed values of said recurrence elements between said SOM and said FOM.

38. The optimizer of claim 37 wherein said computer programmed loop includes an induction variable for assisting said CPU to compute said recurrence elements.

39. The optimizer of claim 37 further comprising:
  means for replacing instructions to direct said CPU to locate a loop invariant computation; and
  means for placing said recurrence elements and loop invariant computation outside of said computer programmed loop.

40. A method for generating optimized source code from source code including code for instructing a central processing unit (CPU) to compute a primary recurrence element, said CPU operatively coupled to fast operating memory (FOM) and slow operating memory (SOM) for storing said generated optimized source code, said method comprising:
  replacing instructions to direct said CPU to store a computed value of said primary recurrence element in a storage location of said SOM with instructions to direct said CPU to place said computed value of said primary recurrence element in a storage location of said FOM; and
  inserting instructions to direct said CPU to consign a value of said primary recurrence element loaded in said storage location of said FOM to another storage location of said FOM.

41. The method of claim 40 wherein said source code includes code for instructing said CPU to a compute value of a subsequent recurrence element.

42. The method of claim 40 wherein said inserting instructions further includes inserting an instruction to direct said CPU to store a value of a recurrence element loaded in said FOM memory to said SOM.

43. The method of claim 40 wherein said inserting instructions further includes inserting an instruction to direct said CPU to load initial values of said subsequent recurrence elements from said SOM to said FOM.

44. The method of claim 40 further comprising compiling said optimized code to generate executable optimized executable code.

45. The method of claim 40 wherein said source code includes a computer programmed loop for directing said CPU to alternate execution of load/read and store write instructions for transferring computed values of said recurrence elements between said SOM and said FOM.

46. The method of claim 45 wherein said computer programmed loop includes an induction variable for assisting said CPU to compute said recurrence elements.

47. The method of claim 45 further comprising:
  replacing instructions to direct said CPU to locate a loop invariant computation; and
  placing said recurrence elements and loop invariant computation outside of said computer programmed loop.

48. A computer program product for use in a computer system operatively coupled to a computer readable memory, the computer program product including a computer-readable data storage medium tangibly embodying computer readable program instructions for carrying out a method comprising:
  instructing a central processing unit (CPU) to compute a primary recurrence element, said CPU operatively coupled to fast operating memory (FOM) and slow operating memory (SOM) for storing generated optimized source code;
  replacing instructions to direct said CPU to store a computed value of said primary recurrence element in a storage location of said SOM with instructions to direct said CPU to place said computed value of said primary recurrence element in a storage location of said FOM; and
  inserting instructions to direct said CPU to consign a value of said primary recurrence element loaded in said storage location of said FOM to another storage location of said FOM.

* * * * *